(12) United States Patent
Boeckmann et al.

(10) Patent No.: US 10,072,145 B2
(45) Date of Patent: Sep. 11, 2018

(54) THERMOPLASTIC MOULDING COMPOSITIONS WITH APPROPRIATELY DESIGNED GRAFT SHELL

(71) Applicant: INEOS STYROLUTION GROUP GMBH, Frankfurt (DE)

(72) Inventors: Philipp Boeckmann, Bad Duerkheim (DE); Wolfgang Fischer, Walldorf (DE); Maarten Staal, Limburgerhof (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/038,510

(22) PCT Filed: Nov. 19, 2014

(86) PCT No.: PCT/EP2014/075033
§ 371 (c)(1),
(2) Date: May 23, 2016

(87) PCT Pub. No.: WO2015/078751
PCT Pub. Date: Jun. 4, 2015

(65) Prior Publication Data
US 2016/0297957 A1    Oct. 13, 2016

(30) Foreign Application Priority Data

Nov. 26, 2013    (EP) .................................. 13194463

(51) Int. Cl.
| | |
|---|---|
| *C08F 285/00* | (2006.01) |
| *C08L 25/14* | (2006.01) |
| *C08L 25/12* | (2006.01) |
| *C08J 5/18* | (2006.01) |
| *C09D 125/12* | (2006.01) |

(52) U.S. Cl.
CPC ............ *C08L 25/12* (2013.01); *C08F 285/00* (2013.01); *C08J 5/18* (2013.01); *C08L 25/14* (2013.01); *C09D 125/12* (2013.01); *C08J 2325/12* (2013.01); *C08J 2451/00* (2013.01); *C08L 2207/53* (2013.01)

(58) Field of Classification Search
CPC .... C08F 265/00; C08F 265/04; C08F 257/02; C08F 285/00; C08L 25/12; C08L 25/14; C08L 2207/53; C08J 5/18; C08J 2325/12; C08J 2451/00
See application file for complete search history.

(56) References Cited

U.S. PATENT DOCUMENTS

| | | | |
|---|---|---|---|
| 4,634,734 A | 1/1987 | Hambrecht et al. | |
| 4,788,253 A | 11/1988 | Hambrecht et al. | |
| 5,196,480 A | 3/1993 | Seitz et al. | |
| 5,252,666 A | 10/1993 | Seitz et al. | |
| 6,066,693 A * | 5/2000 | Fischer ................. | C08F 257/02 525/143 |
| 6,111,012 A * | 8/2000 | Fischer ................. | C08F 257/02 525/143 |
| 2011/0275763 A1 | 11/2011 | Niessner | |

FOREIGN PATENT DOCUMENTS

| | | |
|---|---|---|
| CA | 2143168 A1 | 8/1995 |
| DE | 1260135 B | 2/1968 |
| DE | 2311129 A1 | 9/1974 |
| DE | 3149358 A1 | 6/1983 |
| DE | 3227555 A1 | 1/1984 |
| DE | 4006643 A1 | 9/1991 |
| DE | 4131729 A1 | 3/1993 |
| EP | 0139971 A2 | 5/1985 |
| EP | 0450485 A2 | 10/1991 |
| EP | 0535456 A1 | 4/1993 |
| EP | 0669367 A1 | 8/1995 |
| EP | 0698637 A2 | 2/1996 |
| GB | 1124911 A | 8/1968 |
| WO | 2007142473 A1 | 12/2007 |

* cited by examiner

*Primary Examiner* — Irina Sopjia Zemel
*Assistant Examiner* — Jeffrey S Lenihan
(74) *Attorney, Agent, or Firm* — J.A. Lindeman & Co., PLLC

(57) ABSTRACT

The invention relates to a thermoplastic molding composition which comprises at least one copolymer component made of styrene monomers and nitrile monomers, and also at least one graft copolymer based on an acrylate rubber. The invention also relates to thermoplastic moldings produced from the thermoplastic molding composition, and the use thereof.

16 Claims, 8 Drawing Sheets

THERMOPLASTIC MOULDING COMPOSITIONS WITH APPROPRIATELY DESIGNED GRAFT SHELL

The invention relates to a thermoplastic molding composition which comprises at least one copolymer component made of styrene monomers and nitrile monomers, and also at least one graft copolymer based on an acrylate rubber, and also to thermoplastic moldings produced therefrom, and use thereof.

The production of copolymers made of styrene monomers and nitrile monomers (hard components) is known to the person skilled in the art: the production of a styrene-acrylonitrile copolymer matrix (SAN) is described in US 2011/0275763 and in Kunststoff-Handbuch [Plastics handbook] (Vieweg-Daumiller, Vol. V Polystyrol [Polystyrene], Carl-Hanser-Verlag, Munich, 1969, p. 124, lines 12 ff.). The production of graft copolymers is disclosed in EP-A 0450485 and DE 1981 3149358. The production of styrene-acrylonitrile copolymer molding compositions with at least one acrylate rubber (e.g. ® Luran S) is described in US 2011/0275763. WO 2007/142473 describes acrylate-styrene-acrylonitrile copolymers (ASA) and use thereof in thermoplastic compositions.

A graft copolymer is produced by grafting, usually in two stages, thus forming one or more complex graft shells on a graft base (rubber component). In general it is the vinylaromatic monomer (e.g. styrene) that is first polymerized in the presence of the previously produced, large-particle graft base (rubber component). In the second grafting stage, a graft copolymerization can then take place with a mixture of monomers comprising at least one vinylaromatic monomer (e.g. styrene) and at least one polar copolymerizable monomer (e.g. acrylonitrile).

Figure 1:
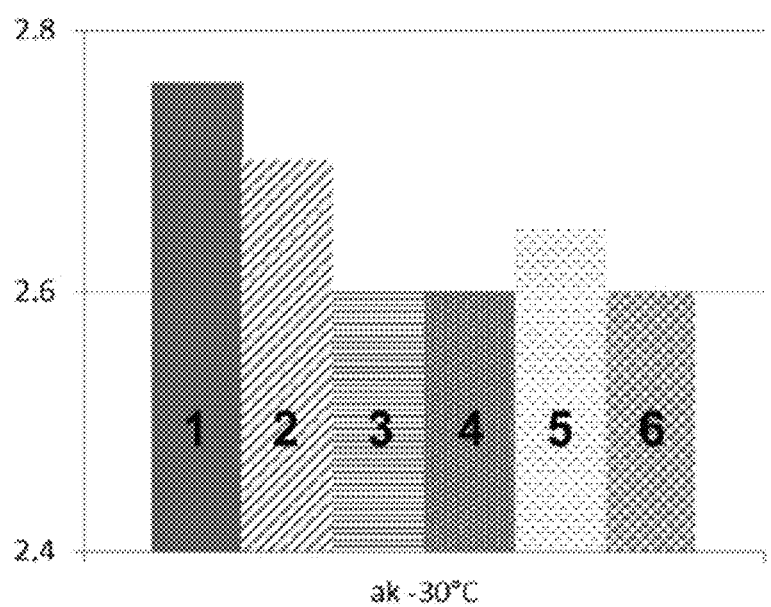
FIG. 1 shows the notched impact resistance (ak) at −30° C. for the molding compositions.

The present invention is based on the object of providing thermoplastic molding compositions with improved mechanical properties, where said properties are achieved by using a graft shell of appropriately designed structure in the production of the graft copolymer component. By optimizing the conduct of the process during the graft polymerization, it is possible to achieve improved matching of the structure of graft shells with the copolymer component used, in particular with an SAN copolymer matrix.

The present invention also relates to thermoplastic compositions which comprise at least one styrene copolymer A and at least one rubber component based on acrylate-styrene-acrylonitrile (ASA) copolymers B, and also to a particular process for the production of the molding compositions with improved impact resistance and other advantageous properties. Thermoplastic molding compositions often comprise graft rubbers as impact modifiers, see DE-A 1260135 and DE-A 2311129. If a composition comprises styrene copolymers, in particular styrene-acrylonitrile copolymers (SAN), the effectiveness of the graft copolymers in relation to their impact-modifying effect increases as the size of the graft copolymer particles increases.

When small-particle graft rubbers are used, there is the problem that the toughness of the impact-modified compositions depends greatly on the processing temperature. The properties of ASA graft copolymers can be improved by the copolymeric "soft phase", the graft copolymer component B, comprising a plurality of graft shells (grafts), these being applied sequentially to the graft base during the process for producing component B. Impact-resistant, multiphase emulsion copolymer molding compositions of ASA type have a particularly balanced property profile when the acrylate soft phase is based by way of example on the monomer butyl acrylate, but small quantities of another ester are also used for the production of the graft base. EP-A 0 535 456 describes a thermoplastic molding composition comprising a styrene/acrylonitrile copolymer and a graft copolymer, where the graft base comprises a cyclic ester, in particular DCPA (acrylate of tricyclodecenyl alcohol). DE-A 40 06 643 describes a thermoplastic molding composition made of a styrene/acrylonitrile copolymer and of a particulate graft copolymer, where a crosslinked acrylate rubber with particle size from 30 to 1000 nm is used as graft base.

The present invention provides a thermoplastic molding composition comprising the following components (or in particular consisting thereof):

from 55 to 85% by weight of at least one copolymer A composed of styrene and/or α-methylstyrene A1 and of acrylonitrile A2, from 10 to 40% by weight of at least one graft copolymer B composed of B1: from 50 to 80% by weight, preferably from 60 to 70% by weight, based on B, of an elastomeric, crosslinked acrylate polymer B1 with average particle diameter (weight average) in the range from 300 to 700 nm as graft base B1, B2: a first graft shell B2 made of from 5 to 30% by weight, preferably from 10 to 20% by weight, based on B, of a vinylaromatic monomer B21, and B3: a second graft shell B3 made of from 15 to 40% by weight, preferably from 20 to 30% by weight, based on B, of a mixture of vinylaromatic monomers B31 and nitrile monomers B32, where the ratio by weight of these monomers B31 to B32 in the graft shell B3 is from 4:1 to 3:2, from 0 to 30% by weight of at least one small-particle graft copolymer B' with average particle diameter (weight average) from 80 to 200 nm, from 0 to 5% by weight of additives and/or auxiliaries C, where the content of nitrile monomer (unit) in copolymer component A of the thermoplastic molding composition and the content of nitrile monomer (unit) in the graft shell B3 differ by at least 8% by weight.

It is preferable that the content of nitrile monomer (e.g. acrylonitrile unit) in copolymer component A of the thermoplastic molding composition is markedly higher than the content of nitrile monomer (e.g. acrylonitrile unit) in the graft shell B3. The content differs in the invention by at least 8% by weight, frequently by at least 9% by weight, and often by at least 10% by weight.

The invention also provides a molding composition in which the graft copolymer B is produced by starting from a graft base B1 with average particle diameter (weight average) in the range from 400 to 600 nm, in particular from 440 to 520 nm.

The invention also provides a molding composition in which the graft copolymer B is produced from:
from 60 to 70% by weight of the graft base B1, and
from 10 to 20% by weight of the graft shell B2, preferably made of styrene, and also
from 20 to 30% by weight of a graft shell B3 composed of B31 and B32 in a ratio by weight of from 78:22 to 72:28.

The invention also provides a molding composition in which the graft copolymer B is produced by starting from a graft base B1 with butyl acrylate content >90% by weight, in particular from 92 to 99% by weight, based on B1. Tricyclodecenyl acrylate is frequently used as other monomer for the graft base B1, for example in a quantity <10% by weight, often <9% by weight, in particular from 1 to 8% by weight.

The invention also provides a molding composition in which the graft copolymer B is produced by starting from: from 60 to 70% by weight of the graft base B1, from 10 to 20% by weight of styrene B2, and from 20 to 30% by weight of a mixture B3 of styrene and acrylonitrile in a ratio by weight of 75:25.

The invention also provides a molding composition in which the at least one copolymer A is composed of styrene A1 and acrylonitrile A2 in the ratio by weight of about 2:1, in particular 67:33, and wherein the molding composition components A and B in a ratio by weigh of 85:15 to 60:35.

The invention also provides a molding composition which comprises: from 55 to 85% by weight, often from 65 to 80% by weight, of copolymers A, from 10 to 40% by weight, often from 10 to 35% by weight, of graft copolymer B, and also from 0.2 to 5% by weight of conventional additives and/or conventional auxiliaries C. In another embodiment, the molding composition also comprises, alongside from 10 to 20% by weight of the graft copolymer B, from 10 to 30% by weight, often from 10 to 20% by weight, of another ASA graft copolymer component B', where this component B' has only one simple graft shell made of styrene and/or acrylonitrile on acrylate graft base B1.

The invention also provides a molding composition in which the particle size distribution of the graft base B1 is narrow (Q preferably being from 0.14 to 0.2) and the particle size distribution of the graft copolymer B is also narrow (Q preferably being from 0.14 to 0.2).

The invention also provides a molding composition in which the graft copolymer B has a first graft shell B2 made of styrene and a second graft shell B3 made of styrene and acrylonitrile, where the acrylonitrile content of the graft shell B3 is from 15 to 25% by weight, in particular from 18 to 23% by weight, in some cases from 19 to 22.5% by weight (based on B3).

The invention also provides a molding composition in which the average particle diameter (weight average) of the graft copolymer B equipped with two graft shells (B2 and B3) is in the range from 400 to 600 nm, in particular from 500 to 580 nm.

The invention also provides a process for the production of a thermoplastic styrene copolymer molding composition obtainable via mixing of the constituents or components of the molding composition described above.

The invention also provides, as significant subject matter, a process for the production of a thermoplastic styrene copolymer molding composition (in particular the molding compositions described above), characterized in that it includes the following steps:
a) a graft copolymer B is produced by using the following steps:
   a1) an elastomeric, crosslinked acrylate polymer with average particle diameter (weight average) in the range from 300 to 700 nm is used as graft base B1,
   a2) a first graft shell B2 made of a vinylaromatic monomer B21 is applied by polymerization to said graft base B1, where this reaction takes place via continuous addition of the monomer B21 at a temperature below 65° C., and where this step takes place within a period of from 45 to 90 minutes,
   a3) a second graft shell B3 made of a mixture of vinylaromatic monomers B31 and nitrile monomers B32 is applied by polymerization on the copolymer product obtained from step a2), where the monomers B31 and B32 are present in a ratio by weight of about 3:1 in the graft shell B3, where this reaction takes place via continuous addition of the monomer mixture at a temperature of from 60 to 68° C., and where this step takes place within a period of from 120 to 240 minutes,
b) the graft copolymer B obtained is isolated by precipitation and subjected to a drying step,
c) a quantity of from 10 to 40% by weight of the graft copolymer B obtained is mixed with from 55 to 85% by weight of at least one copolymer A composed of styrene and/or α-methylstyrene A1 and of acrylonitrile A2, where A1 and A2 are present in a ratio by weight of about 2:1 in the copolymer A, and optionally with from 0 to 5% by weight of other additives and/or auxiliaries C.

In another aspect of the invention, the copolymer product obtained in step a2) also comprises from 0.1 to 10% by weight of styrene monomer which is available for the polymerization for the second graft shell B3, and thus increases the proportion of styrene in the mixture then used (made of styrene B31 and acrylonitrile B32).

The invention also provides a process for the production of a thermoplastic styrene copolymer molding composition where the graft copolymer B is produced by starting from a graft base B1 made of butyl acrylate and tricyclodecenyl acrylate with average particle diameter (weight average) in the range from 440 to 520 nm, and the graft shell B2 is composed of styrene, and the graft shell B3 is composed of styrene and acrylonitrile in a ratio by weight of from 76:24 to 74:26, and the copolymer A is composed of styrene and acrylonitrile in a ratio by weight of about 2:1, in particular 67:33.

The invention also provides the use of the abovementioned molding composition for the production of moldings, films, or coatings. The invention further provides moldings, films, and coatings produced from a molding composition as described above or as obtainable by the process described.

The thermoplastic copolymer molding compositions mentioned can also comprise a plurality of SAN components A and a plurality of graft copolymer components B. They have improved mechanical properties both before and after weathering.

The average particle size of the graft copolymers B is often from 440 to 520 nm. The present invention provides improved thermoplastic copolymer molding compositions comprising at least two different graft copolymers B and B'. It is possible here to use two separately produced graft copolymers B and B', in each case based on a crosslinked acrylate graft base B1. However, whereas B has two graft shells, a conventional graft copolymer with only one shell made of acrylonitrile/styrene is used as B'.

The compositions or molding compositions preferably comprise the following components:

SAN copolymer A composed of by way of example 67% by weight of styrene and 33% by weight of acrylonitrile, graft copolymer B with average particle size from 500 to 580 nm, auxiliaries and/or additives C.

In one embodiment of the invention, compositions or molding compositions also comprise the following component:

graft copolymer B' with average particle size from 80 to 200 nm.

The ratio by weight of component A to component B is often from 8:1 to 2:1. The respective ratios by weight in the polymer compositions are often:

a) of A and B often about 70:30;
b) of A, B, and B' often about 70:10:20.

The invention further provides a process for the production of a thermoplastic copolymer composition, as described above, where at least one SAN copolymer A, and also at least one graft copolymer B with defined graft-base-graft-shell morphology, and optionally B', are produced and these components are optionally mixed with the other auxiliaries and/or additives C.

The graft base B1 is composed of an acrylate polymer material with glass transition temperature Tg below 0° C., frequently composed of from >90 to 99% by weight of at least one C2-C4-alkyl acrylate and from 0.5 to <10% by weight of another acrylate, e.g. tricyclodecenyl acrylate. The other acrylate here is not a C2-C4-alkyl acrylate, but instead is another acrylate, for example the tricyclodecenyl acrylate mentioned.

The invention also provides moldings, films, fibers, or coatings comprising a thermoplastic molding composition, as described above, these also being suitable for external applications, e.g. in the case of motor vehicle parts. The individual components of the compositions are characterized in more detail hereinafter.

Component A

Quantities used of component A are from 50 to 85% by weight, preferably from 55 to 80% by weight. Suitable main monomers are styrene and styrene derivatives such as α-methylstyrene and ring-alkylated styrenes, for example p-methylstyrene. It is preferable to use styrene or α-methylstyrene, and in particular styrene. Preferred ancillary monomers used are acrylonitrile and/or methacrylonitrile, preferably acrylonitrile. The proportion of the main monomer (such as styrene) in the copolymer A is generally from 65 to 75% by weight, preferably from 66 to 68% by weight, often about 67% by weight. The proportion of the ancillary monomer in the copolymer A is generally from 25 to 35% by weight, preferably from 32 to 34% by weight, often about 33% by weight.

A is preferably a copolymer of styrene and acrylonitrile. This SAN copolymer is often produced with (about) 67% by weight of styrene and (about) 33% by weight of AN. The molar mass of the SAN copolymer A is often in the range (Mw) from 120 000 to 180 000 g/mol, measured by conventional methods known to the person skilled in the art, e.g. gel permeation chromatography (GPC). A can be produced by well-known methods (DE-A 31 49 358 and DE-A 32 27 555), for example by well-known bulk, solution, suspension, or aqueous emulsion copolymerization at conventional temperatures in known apparatuses.

Component B

Quantities used of component B are generally from 10 to 40% by weight, or if a plurality of rubbers are used preferably from 10 to 30% by weight.

Monomers that can be used to produce the rubbery graft base are generally alkyl (meth)acrylates having a straight-chain or branched alkyl moiety having from 2 to 8 carbon atoms, preferably from 2 to 4 carbon atoms.

Preference is given to alkyl acrylate having a straight-chain or branched alkyl moiety preferably having from 2 to 8 carbon atoms, particularly preferably from 2 to 4 carbon atoms, in particular n-butyl acrylate. The alkyl (meth)acrylates can be used individually or in a mixture during the production of the graft base.

The rubbery graft base moreover comprises at least one crosslinking agent. By way of example, from 0.1 to 2.0% by weight of allyl methacrylate and from 0.5 to 2.5% by weight, often from 1 to 2.5% by weight, of the acrylate of tricyclodecenyl alcohol (dicyclopentadienyl acrylate; DCPA) are used. It is possible to use two crosslinking agents, but preferable to use only one. From 1 to 2.5% by weight, in particular from 1.5 to 2.1% by weight, of DCPA (based on component B) is often used.

The rubbery graft base can moreover comprise up to 18% by weight of other copolymerizable monomers. However, there are often no other crosslinking agents present. Examples of suitable monomers are divinylbenzene, diallyl maleate, diallyl fumarate, and/or diallyl phthalate, and triallyl cyanurate.

Monomers suitable for the production of the graft shell B1 are vinylaromatic monomers such as styrene and/or styrene derivatives, for example alkylstyrene, preferably α-methylstyrene, and ring-alkylated styrenes, for example p-methylstyrene and/or tert-butylstyrene. It is preferable to use styrene.

Examples of the polar copolymerizable unsaturated monomers that can be used in addition to the vinylaromatic monomers in graft shell B2 are acrylonitrile and methacrylonitrile. Examples of possible other copolymerizable monomers that can be used are the following compounds: acrylic acid, methacrylic acid, maleic anhydride, methyl methacrylate, ethyl methacrylate, phenylmaleimide, acrylamide, and vinyl methyl ether. Preference is given to methyl methacrylate and/or maleic anhydride. It is preferable that the graft shell B2 is a copolymer of styrene and acrylonitrile.

Component B'

Quantities used of the graft copolymer component B' are from 0 to 30% by weight in the molding compositions, preferably from 10 to 30% by weight, or if a plurality of rubbers are used preferably from 10 to 20% by weight.

Monomers used for the graft base are the corresponding compounds described above for the graft base B1 (in particular butyl acrylate as main component). Monomers used for the graft shell B2 are likewise the compounds described above (in particular styrene and acrylonitrile).

The production of graft copolymers from an elastomeric ASA graft base and a graft shell is well known (see DE 4006643; DE 4131729). Graft copolymers can be produced by grafting in a plurality of stages (DE-A 3227555 and DE-A 31 49 358).

For the production process for the graft copolymers B the general procedure is that the rubbery acrylate polymer B1 serving as graft base is first produced, for example by emulsion polymerization, for example by polymerizing butyl acrylate and the second ester (tricyclodecenyl acrylate) by way of example in aqueous emulsion with, for example, potassium persulfate at temperatures of from 20° to 100° C., preferably from 50 to 80° C. On this resultant polyacrylate latex B1 it is then possible to apply firstly, in a first graft reaction, by way of example styrene (as first graft shell B2), and then, in a further polymerization, a mixture of styrene and acrylonitrile (as second graft shell B3), the graft copolymerization here likewise being preferably carried out in aqueous emulsion.

The graft copolymers B are preferably produced in two stages, where the intermediate products are isolated and stored, but immediate further use of these is also possible. The first stage often applies a first graft shell made only of styrene on the graft base B1. In the second stage it is then possible to carry out the graft copolymerization with a mixture comprising at least one vinylaromatic monomer (styrene) and acrylonitrile.

The quantities of the various components used and comprised in the polymer mixture of the invention have already been described in the introduction.

Components C

The conventional auxiliaries can moreover be used in the polymerization, for example in quantities of from 0 to 5% by weight, often from 0.5 to 5% by weight, often also from 0.5 to 2.5% by weight. Examples that may be mentioned are emulsifiers, for example alkali metal salts of alkyl- or alkylarylsulfonic acids, alkyl sulfates, fatty alcohol sulfonates, salts of higher fatty acids having from 10 to 30 carbon atoms, and resin soaps. Components such as the following are also used: polymerization initiators, e.g. conventional persulfates, for example potassium persulfate, or known redox systems, polymerization auxiliaries, e.g. conventional buffer substances which can set pHs that are preferably from 6 to 9, e.g. sodium bicarbonate and/or sodium pyrophosphate, and/or molecular weight regulators, for example mercaptans, terpinols, and/or dimeric α-methylstyrene. The quantity often used of the molecular weight regulators is from 0 to 3% by weight, based on the weight of the reaction mixture.

The polymer mixture of the invention is produced by incorporating the particulate graft polymers B and optionally B' previously described into the hard component, i.e. the SAN copolymer A. The incorporation can by way of example be achieved in that the particulate graft polymer(s) is/are isolated (precipitated) from the emulsion by adding an electrolyte, and is/are then mixed, optionally after drying, with the hard component A by extrusion, kneading, or rolling the materials together. During the production of this molding composition it is also possible to add the additives mentioned below.

The conventional additives C can be used in the molding compositions, for example in quantities of from 0 to 5% by weight, often from 0.5 to 5% by weight, often also from 0.5 to 2.5% by weight. Examples of additives that can be present are plasticizers, antistatic agents, light stabilizers, lubricants, blowing agents, adhesion promoters, optionally other compatible thermoplastics, fillers, surface-active substances, flame retardants, dyes and pigments, stabilizers to prevent damage due to oxidation, hydrolysis, light (UV), heat, or discoloration, and/or reinforcing agents. Light stabilizers that can be used are any of the conventional light stabilizers, for example compounds based on benzophenone, on benzotriazole, on cinnamic acid, or on organic phosphites and phosphonites; sterically hindered amines can also be used.

Examples of lubricants that can be used are hydrocarbons such as oils, paraffins, PE waxes, PP waxes, fatty alcohols having from 6 to 20 carbon atoms, ketones, carboxylic acids such as fatty acids, montanic acid, and oxidized PE wax, carboxamides, and also carboxylic esters, e.g. with the alcohols ethanol, fatty alcohols, glycerol, ethanediol, and penta-erythritol, and with long-chain carboxylic acids as acid component.

Conventional antioxidants can be used as stabilizers, examples being phenolic antioxidants, e.g. alkylated monophenols, esters and/or amides of β-(3,5-di-tert-butyl-4-hydroxyphenyl)propionic acid, and/or benzo-triazoles. Possible antioxidants are mentioned by way of example in EP-A 698637 and EP-A 669367. Specific phenolic antioxidants that may be mentioned are 2,6-di-tert-butyl-4-methylphenol, pentaerythrityl tetrakis[3-(3,5-di-tert-butyl-4-hydroxyphenyl)propionate and N,N'-di(3,5-di-tert-butyl-4-hydroxyphenylpropionyl)hexa-methylenediamine. The stabilizers mentioned can be used individually or in mixtures.

Other compatible thermoplastics for polymer blends can by way of example be polyesters (e.g. polyethylene terephthalate, polybutylene terephthalate), PMMA, polycarbonate, polyamide, polyoxymethylene, polystyrene, polyethylene, polypropylene, or polyvinyl chloride.

These auxiliaries and/or additives can either be used during the production of the thermoplastic component A or else added to component B and/or B' during the production of the mixture.

The invention further provides moldings produced from the polymer molding compositions of the invention. The molding compositions of the invention can by way of example be pelletized or granulated, or processed to give moldings of any type, for example cable sheathing, films, hoses, fibers, profiles, shoe shells, technical moldings (such as motor vehicle parts), consumer items, and coatings, for example by extrusion, injection molding, blow molding or calendering.

The examples, the figures, and the claims serve to provide a more detailed description of the invention.

EXAMPLES

The thermoplastic compositions or molding compositions produced in the invention can be characterized by measuring various parameters.

a) Charpy notched impact resistances measured in accordance with ISO 179/1 eA at 23° C., and also at −30° C.

b) Charpy impact resistance is measured in accordance with ISO 179/1 eU at −30° C.

c) Average particle size can be determined with an ultracentrifuge by the method of W. Scholtan and H. Lange, Kolloid-Z. and Z. Polymere 250 (1972), 782-796. The ultracentrifuge measurement gives the cumulative mass distribution of the particles in a sample. The $d_{50}$ average particle diameter is defined as the diameter at which the diameters of 50% by weight of the particles are smaller and of 50% by weight of the particles are larger.

Example 1

Production of Graft Base B1

16 parts of butyl acrylate (BA) and 0.4 part of tricyclodecenyl acrylate are heated, with stirring, to 60° C. in 150 parts of water with addition of one part of the sodium salt of a $C_{12}$-$C_{13}$-paraffinsulfonic acid, 0.3 part of potassium persulfate, 0.3 part of sodium hydrogencarbonate, and 0.15 part of sodium phosphate. Ten minutes after the start of the polymerization reaction, a mixture made of 82 parts of butyl acrylate and 1.6 parts of tricyclodecenyl acrylate was added within a period of 3 hours. After monomer addition had ended, reaction was allowed to continue for a further hour.

The solids content of the resultant latex of the crosslinked butyl acrylate polymer was 40% by weight. Average particle size (weight average) was determined as 79 nm. The particle size distribution was narrow (quotient Q=0.20).

Example 2

Production of Graft Copolymer B in Two-stage Graft Reaction a) The following were added at 60° C. to a charge made of 2.5 parts of the latex described above from example 1 with crosslinked butyl acrylate polymer after addition of 50 parts of water and 0.1 part of potassium persulfate during the course of 3 hours: firstly a mixture made of 49 parts of butyl acrylate and 1 part of tricyclodecenyl acrylate, and secondly a solution of 0.5 part of the sodium salt of a $C_{12}$-$C_{13}$-paraffinsulfonic acid in 25 parts of water. Once feed had ended, polymerization was continued for 2 hours. The solids content of the resultant latex of the crosslinked butyl acrylate polymer was 40%. Average particle size (weight average of latex) was determined as 450 nm. The particle size distribution was narrow (quotient Q=0.15).

b) 150 parts of this latex with crosslinked butyl acrylate polymer were mixed with 60 parts of water, 0.03 part of potassium persulfate, and 0.05 part of lauroyl peroxide. 20 parts of styrene were metered into the mixture within a period of 1 h at 61° C., with stirring, and polymerization was then continued for 25 minutes, likewise at 61° C. The dispersion obtained during the graft copolymerization was then polymerized for a further 4 hours with 20 parts of a mixture made of styrene and acrylonitrile (in the ratio of 75:25).

The reaction product was precipitated from the dispersion at 95° C. with a calcium chloride solution, isolated, washed with water, and dried in a current of warm air. The degree of grafting of the resultant graft copolymer B was determined as 40%. The degree of grafting here refers to the ratio by mass of graft core to the entirety of graft core and graft shell:

$$\text{Degree of grafting } [\%] = \frac{(m(\text{graft shell}) * 100)}{(m(\text{graft base}) + m(\text{graft shell}))}.$$

The average particle size of the latex particles B was 560 nm.

Example 3

Production of Thermoplastic Molding Composition

A commercially available SAN copolymer with 67% by weight of styrene and 33% by weight of AN, and a molar mass in the region (Mw) of 160 000 g/mol was used as component A in the following experiments.

The graft copolymer produced in example 2 was used as component B. The resultant molding compositions then exhibited improved mechanical properties when the AN content of the graft shell B3 of component B was at least 8% by weight smaller than in the SAN matrix A, e.g. was about 22% by weight.

The mechanical properties of the moldings (made from the molding compositions) are also particularly advantageous when the AN content in the graft shell B3 exhibits a distribution (from outside to inside in the particles) of, for example, from 12 to 24% by weight, i.e. that part of the graft shell B3 that is further from the graft base B1 has higher AN content, and that part of the graft shell that is closer to the graft base B1 has lower AN content (e.g. 12% by weight).

This can be achieved during the process for producing component B in that the styrene (styrene 1) used during the first graft reaction on the graft base B1 is not consumed entirely in the reaction (by virtue of low temperature (<65° C., in particular of from 60 to 63° C.) and brief continued polymerization (<30 min)) before the styrene/acrylonitrile mixture (styrene 2/AN) is added in the second graft reaction.

The mechanical properties of the molding compositions and, respectively, of the moldings obtained therefrom are also particularly advantageous when a small-particle graft copolymer (B') is also used alongside the coarse-particle graft copolymer (B) and the SAN matrix (A).

The structure of the graft copolymer B, and that of the intermediate products of the production process, can be studied by means of NMR and IR. The first graft stage in the production process (graft base and 1st stage with styrene only→intermediate product: S1) still comprises certain quantities of styrene. From the table below it can be seen that styrene conversion after 90 min is only 38.5% by weight, and unconverted styrene monomer is therefore present. Relatively small available quantities of styrene (e.g. up to 10% by weight (based on B)) can provide an advantage in the production process because "increased styrene content" is available for the second graft shell.

This intermediate product is not isolated in the normal production process because it is converted "in situ" with styrene and acrylonitrile (2nd stage of the graft reaction) directly into the final product B (coarse-particle graft copolymer). However, it is possible to isolate and characterize the intermediate product. Soluble polystyrene (PS) content was determined by precipitating the intermediate product (S1) in the same way as the final product and drying in vacuo at 60° C. The resultant rubber was then washed twice with acetone, and the soluble PS content was thus removed. By comparative measurement of the washed/unwashed intermediate product (S1) by means of NMR (T2 measurement at 30° C.) and IR (ATR technique) it was possible to determine the soluble quantities (% by weight) of PS (based on S1) as follows:

| Sample | IR [%] | NMR [%] |
|---|---|---|
| Unwashed | 15.9 | 17.5 |
| Washed | 13.0 | 13.5 |

This gives the soluble quantity of PS as from 3.0 to 4.0% by weight, based on the total quantity of rubber (S1), i.e. about 20-30% by weight, based on the quantity of styrene used. This implies a technical advantage in the production process because "increased styrene content" is available during the further reaction (second graft shell).

The monomer concentrations can also be determined by using chromatography (GC) during the two-stage grafting process. This gave by way of example the following acrylonitrile contents (1st stage: S1; 2nd stage: S2) as a function of time expired after the start of the first graft polymerization:

| | Time [min] | Styrene Conversion [%] | AN | AN in SAN [wt %] |
|---|---|---|---|---|
| Styrene 1 | 0 | 0 | 0 | 0 |
| | 30 | 30.3 | 0 | 0 |

-continued

|  | Time [min] | Styrene AN Conversion [%] | AN [%] | AN in SAN [wt %] |
|---|---|---|---|---|
| Styrene 2/AN | 60 | 28.5 | 0 | 0 |
|  | 90 | 38.5 | 0 | 0 |
|  | 150 | 78.9 | 74.3 | 15.9 |
|  | 210 | 85.4 | 75.5 | 17.9 |
|  | 270 | 95.5 | 91.1 | 18.7 |
|  | 330 | 97.4 | 95.4 | 19.0 |

AN content (% by weight, determined by gradient polymer elution chromatography (GPEC)) in the graft shell of the coarse-particle graft copolymer (B) reveals a broad AN distribution. Samples were taken after 0, 30, 60, 90, 150, 210, 270, and 330 minutes during the grafting process. AN content increases from 0% (from 30 to 90 min) by way of ~16% (max. after 150 min) to ~19% (max. after 330 min). It is also possible to achieve ~21%.

Example 4

A molding composition is produced by extrusion of 70% by weight of the SAN component A and 30% by weight of the graft copolymer B.

FIG. 1 shows the notched impact resistance (ak) at −30° C. for the molding compositions (1, 2, 3, 4, 5, and 6), where graft copolymers produced in different ways are used, differing in respect of the reaction conditions in the first grafting (temperature and reaction time during the continuous addition of styrene (S1, first graft shell), and also optionally continued polymerization time (NP). The molding composition of the invention depicted as left-hand column (1) exhibits particularly high mechanical stability, the values for the others being poorer.

Figure 2:
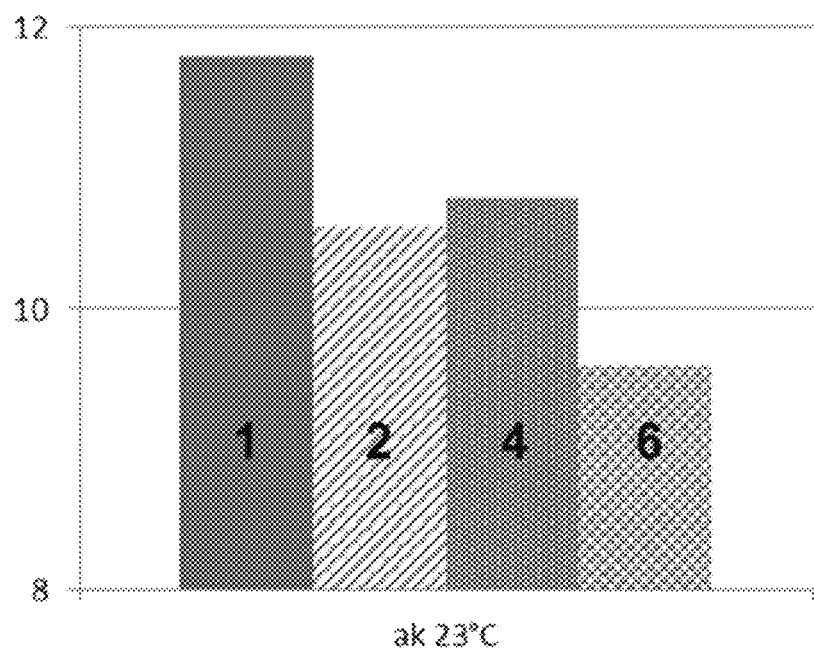
FIG. 2 shows the notched impact resistance (ak) at 23° C. for the molding compositions.

1st column: S1 during 1 h at 61° C.+25 min NP
2nd column: S1 during 3 h at 65° C.
3rd column: S1 during 5 min at 61° C.+2:55 h NP
4th column: S1 during 5 min at 65° C.+2:55 h NP
5th column: S1 in initial charge at RT, heating gradient during 3 h to 61° C.
6th column: S1 in initial charge at RT, heating gradient during 1 h to 65° C.+2 h NP FIG. 2 shows the notched impact resistance (ak) at 23° C. for the molding compositions, where graft copolymers produced in different ways are used, differing in respect of the reaction conditions in the first grafting. Again in the case of column (1) a low temperature (61° C.) and a short reaction time (60+25 minutes) leads to improved properties.

Figure 3:
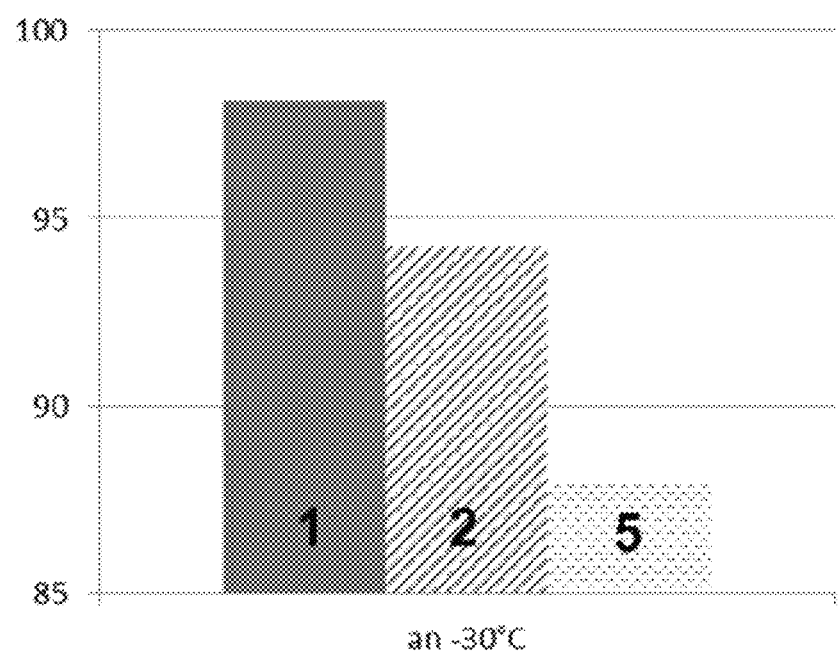
FIG. 3 shows the impact resistance (an) at −30° C. for the molding compositions.

FIG. 3 shows the impact resistance (an) at −30° C. for the molding compositions, where graft copolymers produced in different ways are used, differing in respect of the reaction conditions in the first grafting. Again in the case of column (1) a low temperature (61° C.) and a short reaction time (60+25 minutes) leads to improved properties.

Example 5

A molding composition is produced by extruding 70% by weight of SAN component A and 10% by weight of the graft copolymer B, and also 20% by weight of a smaller-particle graft copolymer B' (with only one graft shell).

Figure 4:
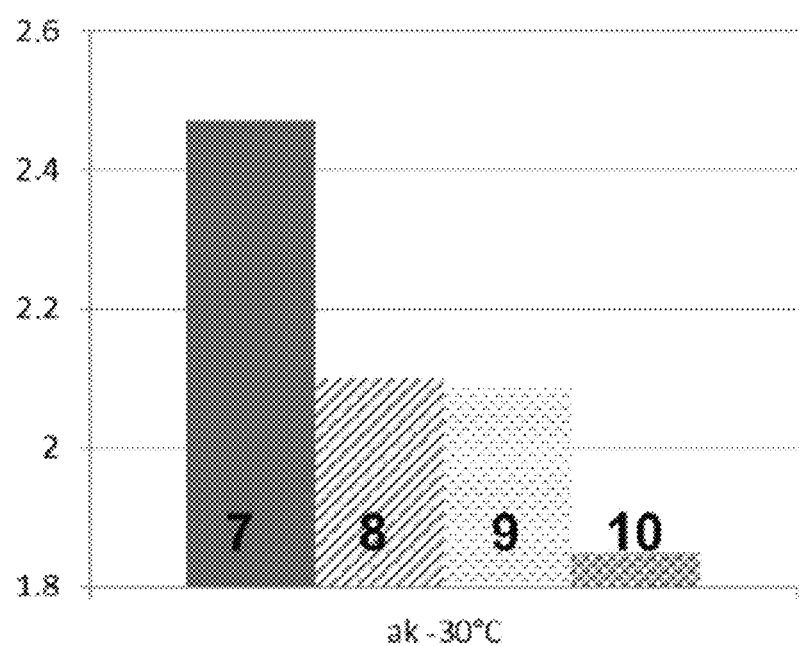
FIG. 4 shows the notched impact resistance (ak) at −30° C. for the molding compositions.

FIG. 4 shows the notched impact resistance (ak) at −30° C. for the molding compositions (7, 8, 9, and 10), where graft copolymers produced in different ways are used, differing in respect of the reaction conditions in the first grafting (temperature and reaction time during the continuous addition of styrene (S1, first graft shell), and also optionally continued polymerization time (NP). The molding composition of the invention depicted as left-hand column (7) exhibits particularly high mechanical stability, the values for the others being poorer.

Figure 5:
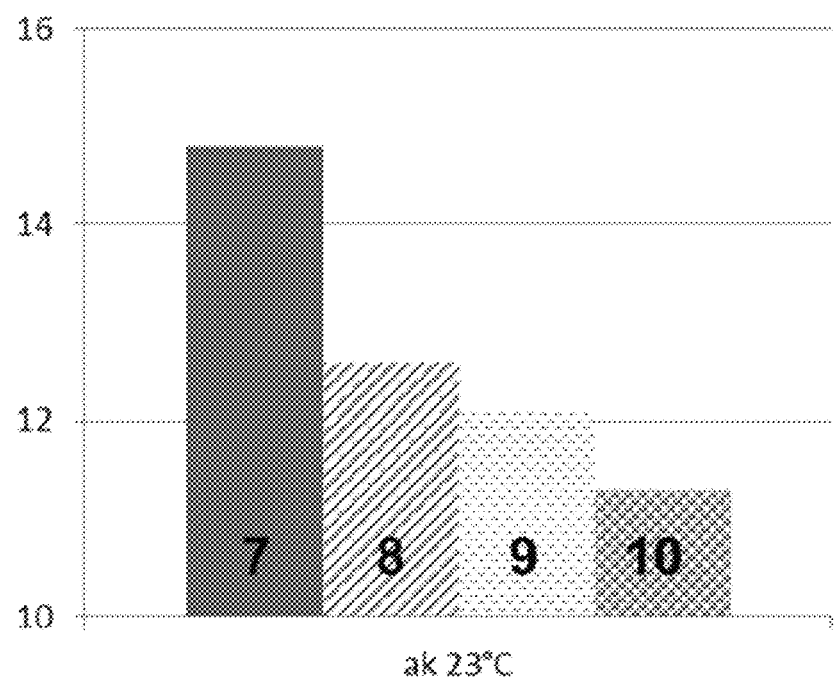
FIG. 5 shows the notched impact resistance (ak) at 23° C. for the molding compositions.

7th column: S1 during 1 h at 61° C.+25 min NP
8th column: S1 during 3 h at 65° C.
9th column: S1 during 5 min at 65° C.+2:55 h NP
10th column: S1 in initial charge at RT, heating gradient during 1 h to 65° C.+2 h NP FIG. 5 shows the notched impact resistance (ak) at 23° C. for the molding compositions (7, 8, 9, and 10), where graft copolymers produced in different ways are used, differing in respect of the reaction conditions in the first grafting.

Figure 6:
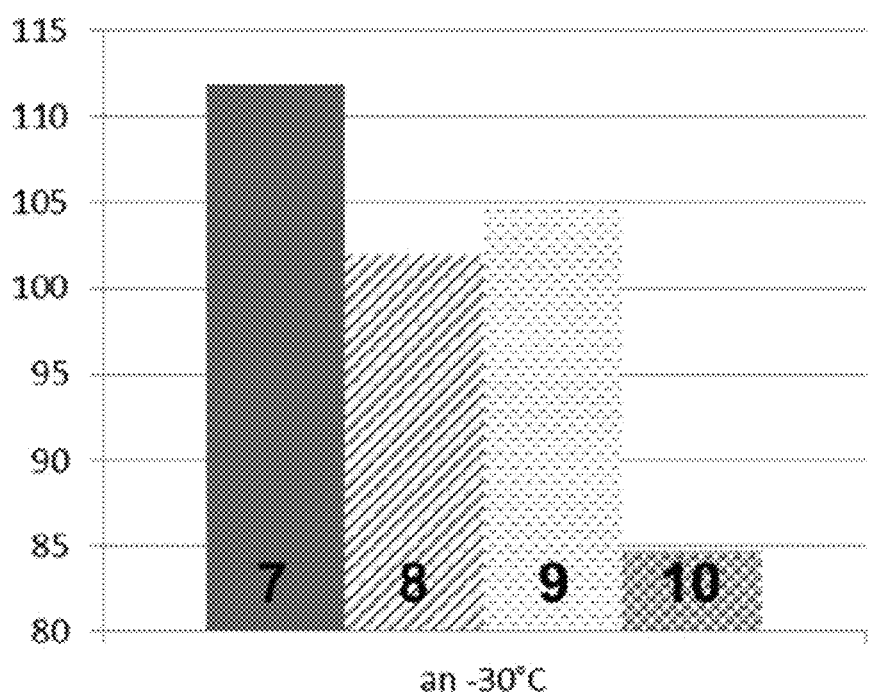
FIG. 6 shows the impact resistance (an) at −30° C. for the molding compositions.

FIG. 6 shows the impact resistance (an) at −30° C. for the molding compositions (7, 8, 9, and 10), where graft copolymers produced in different ways are used, differing in respect of the reaction conditions in the first grafting.

Figure 7:
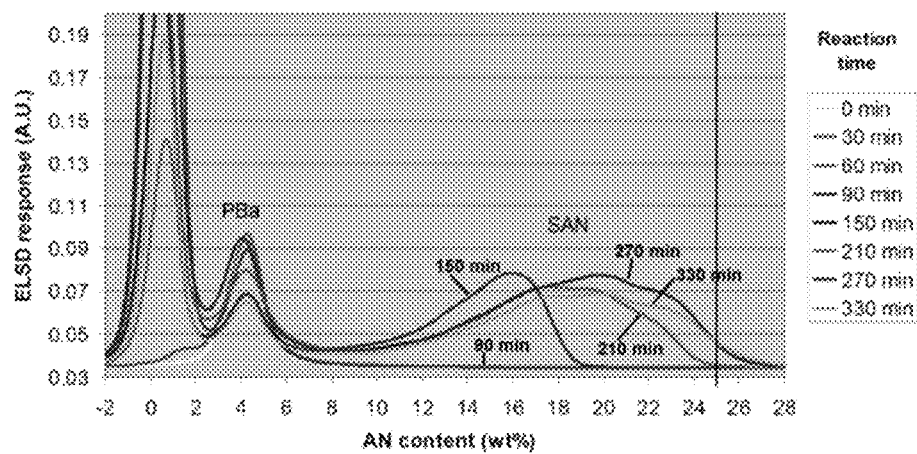
FIG. 7 shows the AN content in the graft shell from 0 to 330 minutes after the start of the reaction.

FIG. 7 is a graph of AN content in the graft shell (determined by means of GPEC) from 0 to 330 minutes after the start of the reaction. A light scattering detector (ELSD, Evaporative Light Scattering Detector) is used, as is conventional in liquid chromatography. The individual eluted components are atomized in a current of inert gas. This forms tiny droplets, which are then evaporated in a heating coil. Fine solid particles are thus produced, and these drift through a laser. The particles cause inelastic scattering of the beam, whereupon a photodiode records the reduction of light intensity. In FIG. 7 the intensity of the measured signal (ELSD) is shown as ordinate, and acrylonitrile content (% by weight) is plotted as abscissa. The various curves represent the various junctures at which samples were taken during the reaction.

AN content of from 18 to 24% by weight in the second graft shell appears to be particularly advantageous.

Figure 8:
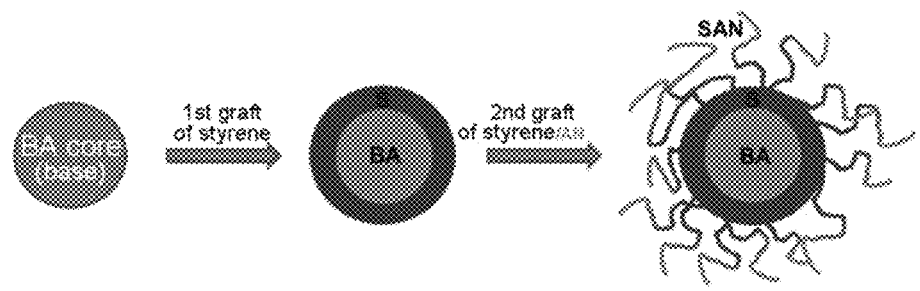
FIG. 8 shows a two-stage graft shell structure on a butyl acrylate core (BA).

FIG. 8 is a diagram to illustrate the two-stage graft shell structure on a butyl acrylate core (BA). This overview of two-stage grafting shows the first graft shell made of styrene (S) and the subsequent 2nd graft shell made of styrene and acrylonitrile.

What is claimed is:
1. A thermoplastic molding composition comprising:
from 55 to 85% by weight of at least one copolymer A composed of 66 to 68% by weight of styrene and/or α-methylstyrene A1 and of 32 to 34% by weight of acrylonitrile A2,
from 10 to 40% by weight of at least one graft copolymer B composed of
B1: from 50 to 80% by weight, based on B, of an elastomeric, crosslinked acrylate polymer B1 with average particle diameter (weight average) in the range from 300 to 700 nm as graft base B1,
B2: a first graft shell B2 made of from 5 to 30% by weight, based on B, of a vinylaromatic monomer B21, and
B3: a second graft shell B3 made of from 15 to 40% by weight, based on B, of a mixture of vinylaromatic monomers B31 and nitrile monomers B32, and wherein the graft shell B3 is composed of styrene as vinylaromatic monomer B31 and acrylonitrile as nitrile monomer B32 in a ratio by weight of from 76:24 to 74:26,
from 0 to 30% by weight of at least one small-particle graft copolymer B' with average particle diameter (weight average) from 80 to 200 nm,
from 0 to 5% by weight of additives and/or auxiliaries C, where the content of nitrile monomer (unit) in copolymer component A of the thermoplastic molding composition is at least 8% by weight higher than the content of nitrile monomer (unit) in the graft shell B3 and where the acrylonitrile content in the graft shell B3 exhibits a distribution, wherein that part of the graft shell B3 that is further from the graft base B1 has higher acrylonitrile content, and that part of the graft shell B3 that is closer to the graft base B1 has lower acrylonitrile content.

2. The molding composition as claimed in claim 1, wherein the at least one graft polymer B is composed of
B1: from 60 to 70% by weight, based on B, of an elastomeric, crosslinked acrylate polymer B1 with average particle diameter (weight average) in the range from 300 to 700 nm as graft base B1,
B2: a first graft shell B2 made of from 10 to 20% by weight, based on B, of a vinylaromatic monomer B21, and
B3: a second graft shell B3 made of from 20 to 30% by weight, based on B, of a mixture of vinylaromatic monomers B31 and nitrile monomers B32, where the ratio by weight of these monomers B31 to B32 in the graft shell B3 is from 76:24 to 74:26.

3. The molding composition as claimed in claim 1, characterized in that the graft copolymer B is produced by starting from a graft base B1 with average particle diameter (weight average) in the range from 400 to 600 nm.

4. The molding composition as claimed in claim 1, characterized in that the graft copolymer B is produced by starting from a graft base B1 with average particle diameter (weight average) in the range from 440 to 520 nm.

5. The molding composition as claimed in claim 1, characterized in that the graft copolymer B is produced from:
from 60 to 70% by weight of the graft base B1, and
from 10 to 20% by weight of the graft shell B2 made of styrene, and also
from 20 to 30% by weight of a graft shell B3 composed of B31 and B32 in a ratio by weight of from 76:24 to 74:26.

6. The molding composition as claimed in claim 1, characterized in that the graft copolymer B is produced by starting from a graft base B1 with butyl acrylate content >90% by weight, based on B1.

7. The molding composition as claimed in claim 1, characterized in that the graft copolymer B is produced by starting from a graft base B1 with butyl acrylate content from 92 to 99% by weight, based on B1.

8. The molding composition as claimed in claim 1, characterized in that the graft copolymer B is produced by starting from:
from 60 to 70% by weight of the graft base B1,
from 10 to 20% by weight of styrene B2, and
from 20 to 30% by weight of a mixture B3 of styrene and acrylonitrile in a ratio by weight of 75:25.

9. The molding composition as claimed in claim 1, characterized in that the at least one copolymer A is composed of styrene A1 and acrylonitrile A2 in the ratio by weight 67:33, and that the molding composition comprises components A and B in a ratio by weight of from 85:15 to 60:35.

10. The molding composition as claimed in claim 1, characterized in that it comprises: from 55 to 80% by weight of copolymers A, from 10 to 40% by weight of graft copolymer B, and also from 0.2 to 5% by weight of additives and/or auxiliaries C.

11. The molding composition as claimed in claim 1, characterized in that the particle size distribution of the graft base B1 is narrow (Q being from 0.14 to 0.2) and the particle size distribution of the graft copolymer B is also narrow (Q being from 0.14 to 0.2).

12. The molding composition as claimed in claim 1, characterized in that the average particle diameter (weight average) of the graft copolymer B equipped with two graft shells (B2 and B3) is in the range from 400 to 600 nm.

13. The molding composition as claimed in claim 1, characterized in that the average particle diameter (weight average) of the graft copolymer B equipped with two graft shells (B2 and B3) is in the range from 500 to 580 nm.

14. A molding, film, or coating comprising a molding composition as claimed in claim 1.

15. A process for the production of a thermoplastic styrene copolymer molding composition, characterized in that it includes the following steps:
a) a graft copolymer B is produced by using the following steps:
a1) an elastomeric, crosslinked acrylate polymer with average particle diameter (weight average) in the range from 300 to 700 nm is used as graft base B1,
a2) a first graft shell B2 made of a vinylaromatic monomer B21 is applied by polymerization to said graft base B1, where this reaction takes place via continuous addition of the monomer B21 at a temperature below 65° C., and where this step takes place within a period of from 45 to 90 minutes and continued polymerization within a period of less than 30 minutes,
wherein the copolymer product obtained in step a2) also comprises from 0.1 to 10% by weight of styrene monomer which is available for the polymerization for the second graft shell B3,
a3) a second graft shell B3 made of a mixture of vinylaromatic monomers B31 and nitrile monomers B32 is applied by polymerization on the copolymer product obtained from step a2), where the monomers B31 and B32 are present in a ratio by weight of about 3:1 in the graft shell B3, where this reaction takes place via continuous addition of the monomer mixture at a temperature of from 60 to 68° C., and where this step takes place within a period of from 120 to 240 minutes,
b) the graft copolymer B obtained is isolated by precipitation and subjected to a drying step,
c) a quantity of from 10 to 40% by weight of the graft copolymer B obtained is mixed with from 55 to 85% by weight of at least one copolymer A composed of styrene and/or α-methylstyrene A1 and of acrylonitrile A2, where A1 and A2 are present in a ratio by weight of about 2:1 in the copolymer A, and optionally with from 0 to 5% by weight of other additives and/or auxiliaries C.

16. The process for the production of a thermoplastic styrene copolymer molding composition as claimed in claim 15, characterized in that the graft copolymer B is produced by starting from a graft base B1 made of butyl acrylate and tricyclodecenyl acrylate with average particle diameter (weight average) in the range from 440 to 520 nm, that the graft shell B2 is composed of styrene, and the graft shell B3 is composed of styrene and acrylonitrile in a ratio by weight of from 76:24 to 74:26, and that the copolymer A is composed of styrene and acrylonitrile in a ratio by weight of 67:33.

* * * * *